United States Patent
O'Banion

(10) Patent No.: US 6,454,235 B1
(45) Date of Patent: Sep. 24, 2002

(54) PICTURE HANGER

(76) Inventor: Michael L. O'Banion, 1230 Canon Way, Westminster, MD (US) 21157

(*) Notice: Subject to any disclaimer, the term of this patent is extended or adjusted under 35 U.S.C. 154(b) by 0 days.

(21) Appl. No.: 09/377,558

(22) Filed: Aug. 19, 1999

Related U.S. Application Data

(60) Provisional application No. 60/097,430, filed on Aug. 21, 1998.

(51) Int. Cl.$^7$ .................................................. A47G 1/24
(52) U.S. Cl. ........................................................ 248/495
(58) Field of Search ................................ 248/489, 466, 248/479, 475.1, 495

(56) References Cited

U.S. PATENT DOCUMENTS

| | | | |
|---|---|---|---|
| 2,488,925 A | * 11/1949 | Miller | 248/31 |
| 3,861,639 A | 1/1975 | Morrill | |
| 4,040,593 A | 8/1977 | Wiley | |
| 4,083,525 A | 4/1978 | Rath | |
| 4,437,639 A | 3/1984 | Stein | |
| 4,591,125 A | 5/1986 | Bellehumeur | |
| 4,611,780 A | 9/1986 | Robertson | |
| 4,712,761 A | * 12/1987 | Wassell | 248/489 |
| 5,425,524 A | * 6/1995 | Messina, Jr. | 248/489 |

* cited by examiner

*Primary Examiner*—Ramon O. Ramirez
(74) *Attorney, Agent, or Firm*—Adan Ayala

(57) ABSTRACT

An improved picture hanger assembly is hereby proposed. The picture hanger assembly for hanging a picture having a center of gravity comprises a wall attachment assembly for attaching to a wall, the wall attachment assembly having a first curved support area extending away from the wall, the first curved support area having a first center at a first radial distance and left and right ends, and a picture attachment assembly for attaching to a picture, the picture attachment assembly having a second curved support area extending away from the picture, the second curved support area being disposable on the first curved support area and having a second center at a second radial distance and left and right ends, wherein the center of gravity lies within an area defined by a first line extending from one of the first and second centers and intersecting the left end of either the first or second curved support areas, and a second line extending from the one of the first and second centers and intersecting the right end of either the first or second curved support areas. Preferably, the first and second curved support areas are substantially concentric. Also, the first and second centers may be below the first and second curvatures. Preferably, the curvature of the second curved support area is substantially equal to or greater than the curvature of the first curved support area.

21 Claims, 6 Drawing Sheets

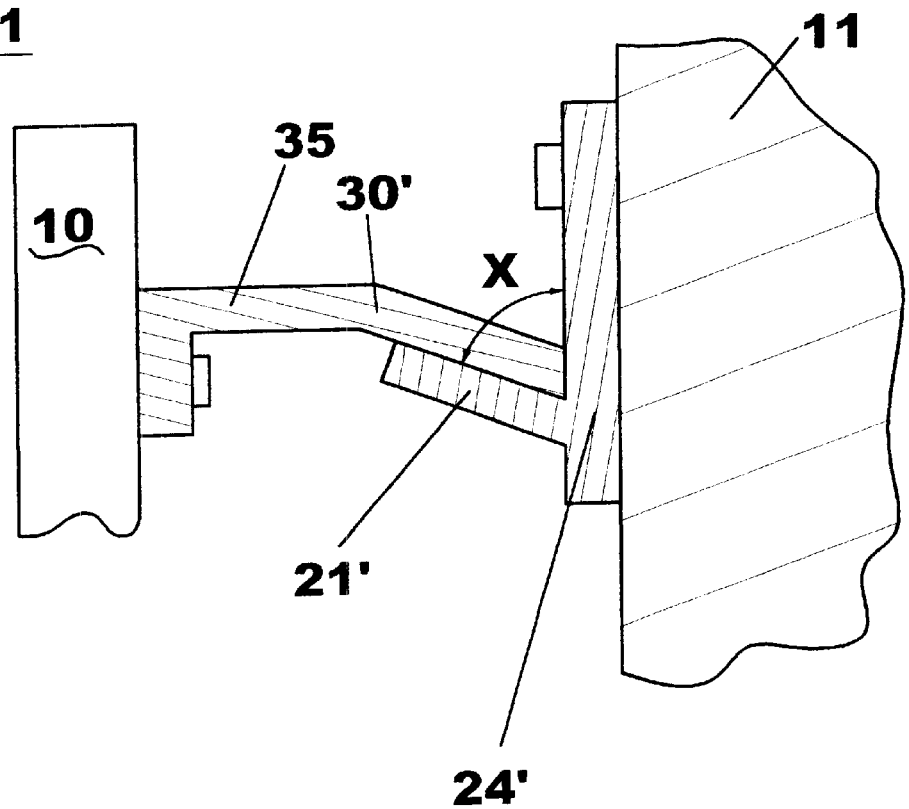

PICTURE HANGER

CROSS-REFERENCE TO RELATED APPLICATION

The present application derives priority under 35 USC §119 from U.S. Provisional Application No. 60/097,430, filed Aug. 21, 1998, now abandoned.

FIELD OF THE INVENTION

This invention relates generally to picture hangers.

BACKGROUND OF THE INVENTION

It is well known in the prior art to affix a nail or hook to a wall, and a string or loop to a picture in order to hang the picture on the wall. Typically this arrangement is problematic because the picture tends to move out of alignment over time.

More elaborate solutions have been proposed in the art, including using special hooks or hangers that mesh with a corresponding part affixed to the wall. Such arrangements however are typically difficult to install correctly or to align.

SUMMARY OF THE INVENTION

An improved picture hanger assembly is proposed. The picture hanger assembly for hanging a picture having a center of gravity comprises a wall attachment assembly for attaching to a wall, the wall attachment assembly having a first curved support area extending away from the wall, the first curved support area having a first center at a first radial distance and left and right ends, and a picture attachment assembly for attaching to a picture, the picture attachment assembly having a second curved support area extending away from the picture, the second curved support area being disposable on the first curved support area and having a second center at a second radial distance and left and right ends, wherein the center of gravity lies within an area defined by a first line extending from one of the first and second centers and intersecting the left end of either the first or second curved support areas, and a second line extending from the one of the first and second centers and intersecting the right end of either the first or second curved support areas. Preferably, the first and second curved support areas are substantially concentric. Also, the first and second centers may be below the first and second curvatures. Preferably, the curvature radius of the second curved support area is substantially equal to or greater than the curvature radius of the first curved support area.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 11 shows a cross-sectional side view of a fifth embodiment of the picture hanger assembly of the present invention.

DETAILED DESCRIPTION

Figure 1:
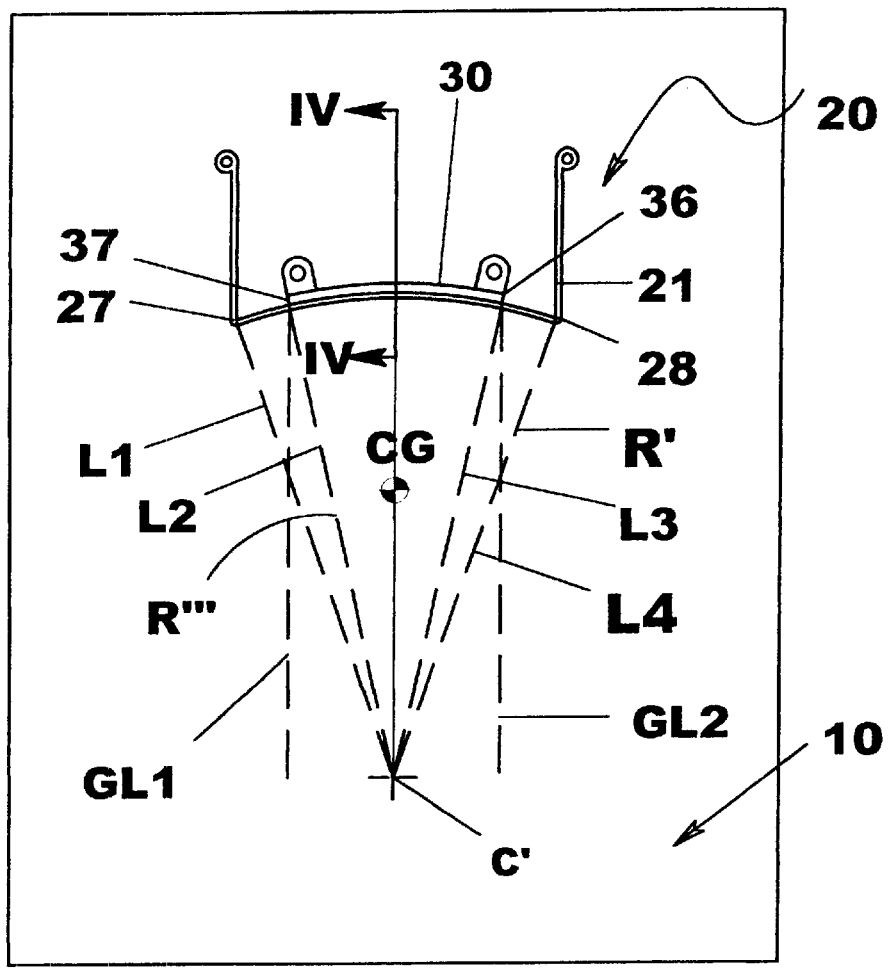
FIG. 1 shows a first embodiment of the picture hanger assembly of the present invention, and its relationship to the center of gravity of the picture.
Figure 4:
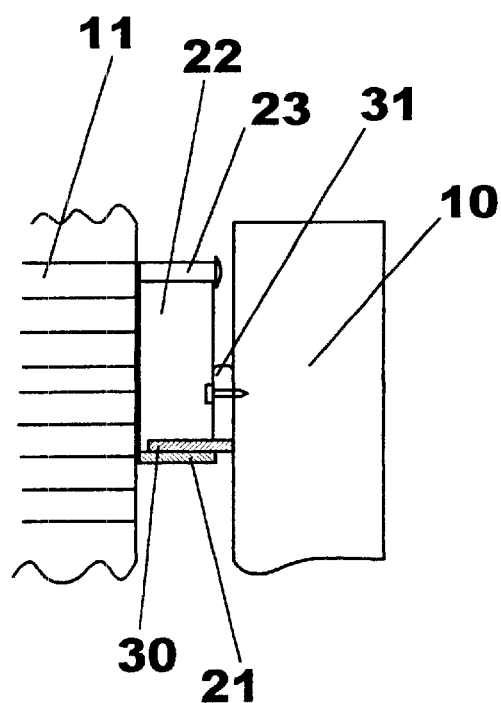
FIG. 4 is a cross-sectional view of the first embodiment of the picture hanger assembly along line IV–IV of FIG. 1.
Figure 2:
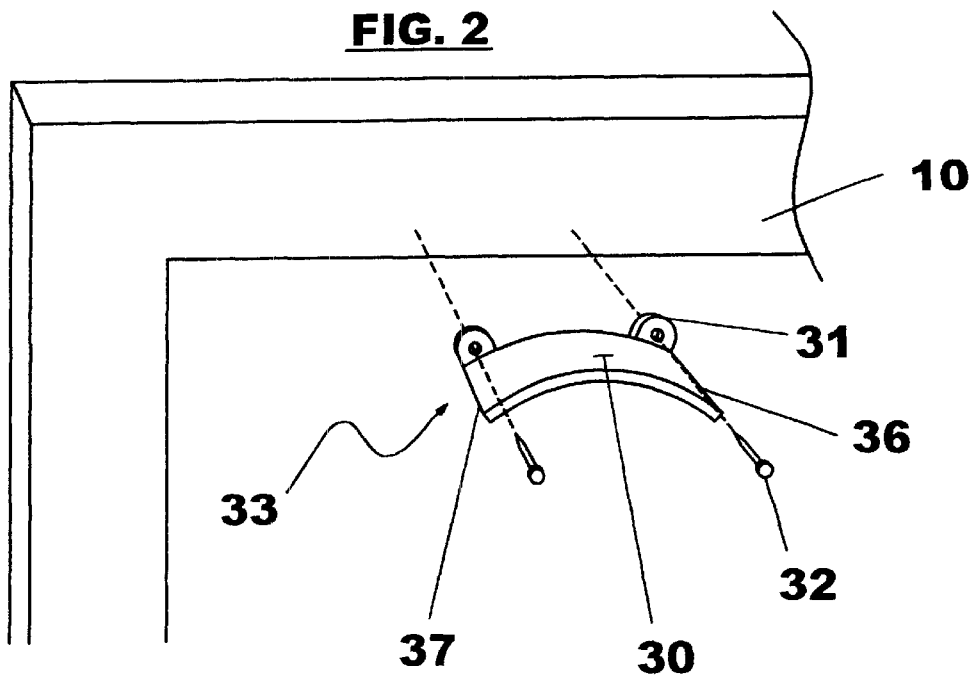
FIG. 2 is an exploded view of the picture attachment assembly of the first embodiment.
Figure 3:
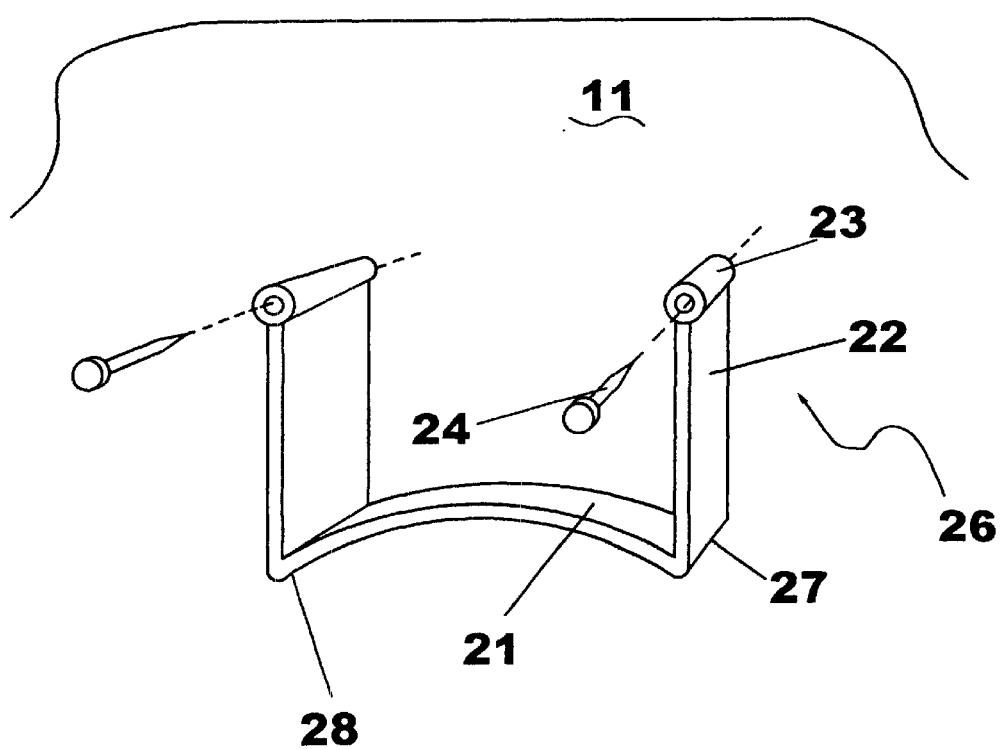
FIG. 3 is an exploded view of the wall attachment assembly of the first embodiment.

The invention is now described with reference to the accompanying figures, wherein like numerals designate like parts. Referring to FIGS. 1–4, a picture hanger assembly 20 is used for hanging a picture 10 having a center of gravity CG. The picture hanger assembly 20 comprises a wall attachment assembly 26 for attaching to a wall 11. The wall attachment assembly 26 preferably has a curved support area 21 extending away from the wall 11. The curved support area 21 may have a center C' at a radial distance R' and left and right ends (27 and 28, respectively). The wall attachment assembly 26 may also include extensions 22 and channels 23 to receive mounting nails 24. Persons skilled in the art will note that at least two nails, or other securing devices, are preferably used to mount wall attachment assembly 26, but these persons should also note that one nail or integral barb may be used for mounting.

The picture hanger assembly 20 also comprises a picture attachment assembly 33 for attaching to the picture 10. The picture attachment assembly 33 may have a curved support area 30 extending away from the picture 10. Curved support area 30 is preferably disposable on the curved support area 21, as discussed below. Curved support area 30 may have a center at a radial distance R'" and left and right ends (37 and 36, respectively).

Preferably, curved support areas 30 and 21 are substantially concentric so that the curvatures of support areas 30 and 21 are relatively the same. However, persons skilled in the art should recognize that the curvature radius of support area 30 may be smaller than the curvature radius of support area 21, so that the center of support area 30 is above center C'. Providing at least one curved support area allows the user to adjust the picture over a range of positions.

Picture attachment assembly 33 may also include mounting ears 31 for receiving mounting nails 32 therethrough. Persons skilled in the art will note that at least two nails are preferably used to mount picture attachment assembly 33, but these persons should also note that one nail may be used for mounting.

It is preferable that the center of gravity CG lie within an area A defined on one side by a left line L1 extending from center C' and intersecting the left end 27 of curved support area 21, and a right line L4 extending from center C' and intersecting the right end 28 of curved support area 21. Persons skilled in the art should recognize that area A may alternatively defined by a left line L2 extending from center C' and intersecting the left end 37 of curved support area 30, and a right line L3 extending from center C' and intersecting the right end 36 of curved support area 30. Alternatively, area A may be defined on one side by either lines L1 or L2 and on the other side by either lines L3 or L4.

Persons skilled in the art should recognize that the lines defining area A may also be drawn from the center of either curved support areas if they are not concentric. Whichever center is chosen, both the left and right lines are preferably drawn from the chosen center.

By disposing the center of gravity CG within area A, the picture hanger assembly 20 diminishes the effect of the moment created by gravity, and thus can maintain picture 10 in alignment. Accordingly, it is preferable that at least one of support areas 30 and 21 are wide, so as to define a larger area A.

Similarly, it is also preferable that the center of gravity CG be disposed between two gravity planes GL1, GL2. Each gravity plane GL1, GL2 originates from the left and right contact lines between support areas 21, 30, respectively, and extends downwardly towards the ground. In other words, while the gravity planes GL1, GL2 are shown to originate from the ends 36, 37 of curved support area 30, persons skilled in the art should recognize that the gravity planes may originate from anywhere between the support areas 21, 30.

Figure 5:
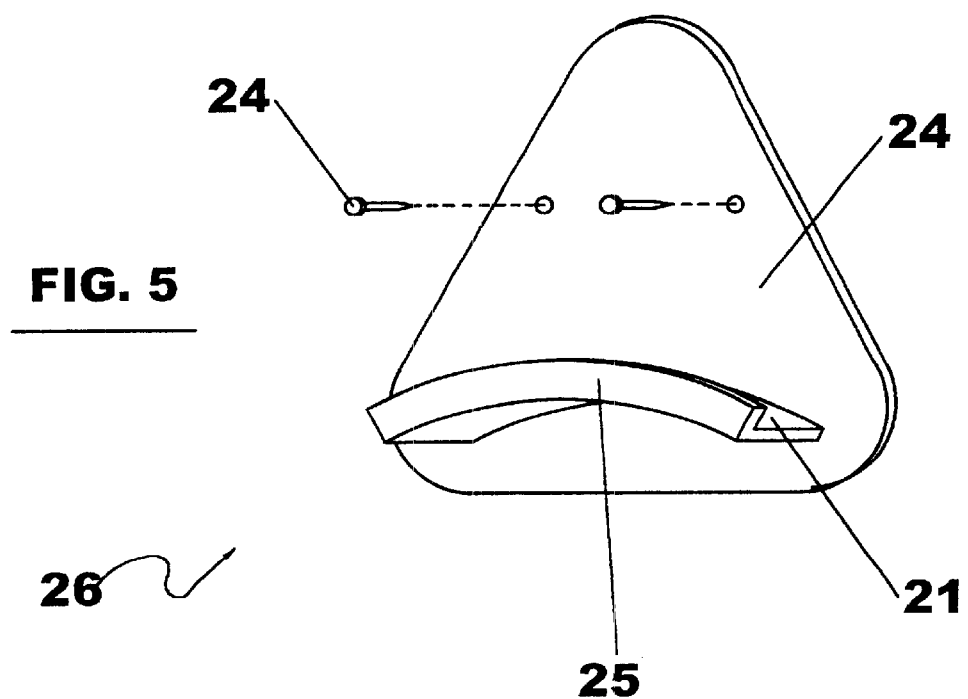
FIG. 5 is a perspective view of the wall attachment assembly of a second embodiment of the picture hanger assembly of the present invention.
Figure 6:
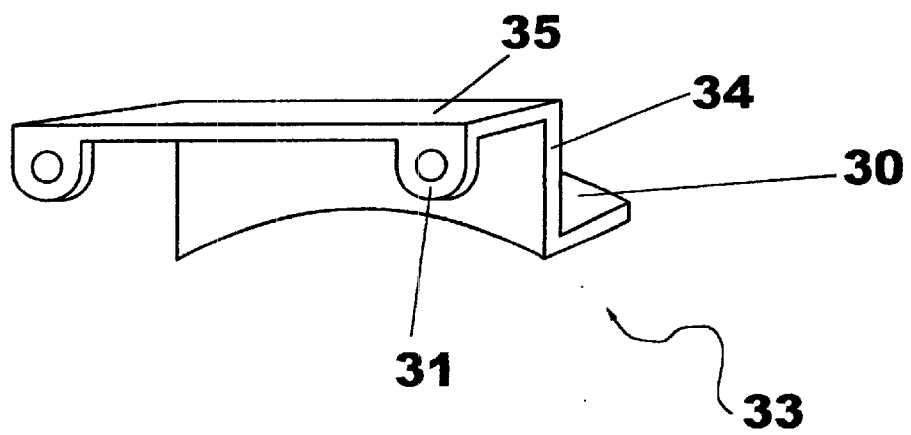
FIG. 6 is a perspective view of the picture attachment assembly of the second embodiment.
Figure 7:
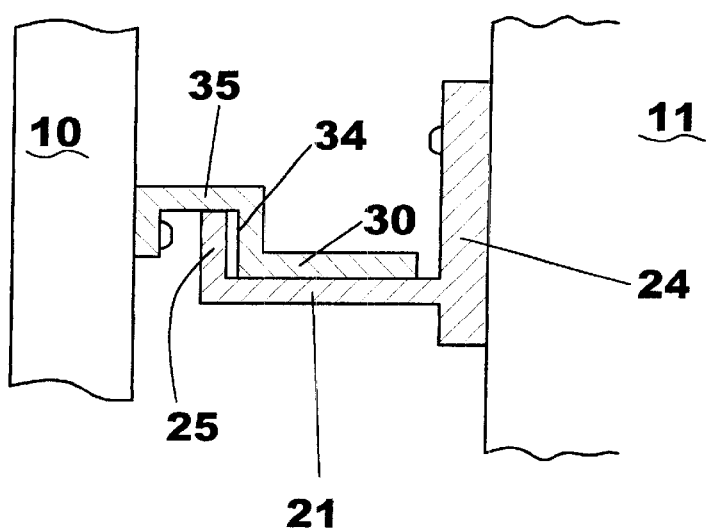
FIG. 7 is a cross-sectional view of the picture hanger assembly of the second embodiment, the cross-sectional view taken along a line similar to line IV–IV of FIG. 1.

A second embodiment of the present invention is shown in FIGS. 5–7, which also incorporates the above teachings and where like numerals refer to like parts. The main differences are that extensions 22 and channels 23 have been replaced by a main body 24, and a retaining lip 25 has been added to support area 21. Persons skilled in the art shall recognize that by replacing extensions 22 with main body 24 allows use of a support area 30 wider than support area 21, which could not be done with extensions 22, and thus defining a wider area A for center of gravity CG to lie within. In addition, main body 24 can be shaped in any aesthetically pleasing manner.

Persons skilled in the art will also recognize that lip 25 engages and/or contacts retaining walls 34 and/or 35 of picture attachment assembly 33, so as to prevent support area 30 from slipping off support area 21.

Persons skilled in the art will recognize that support areas 21, 30 may be inclined at an angle X relative to the wall 11, as shown in FIG. 11. Preferably, the angle X will be between about 60° and about 70°.

Figure 8:
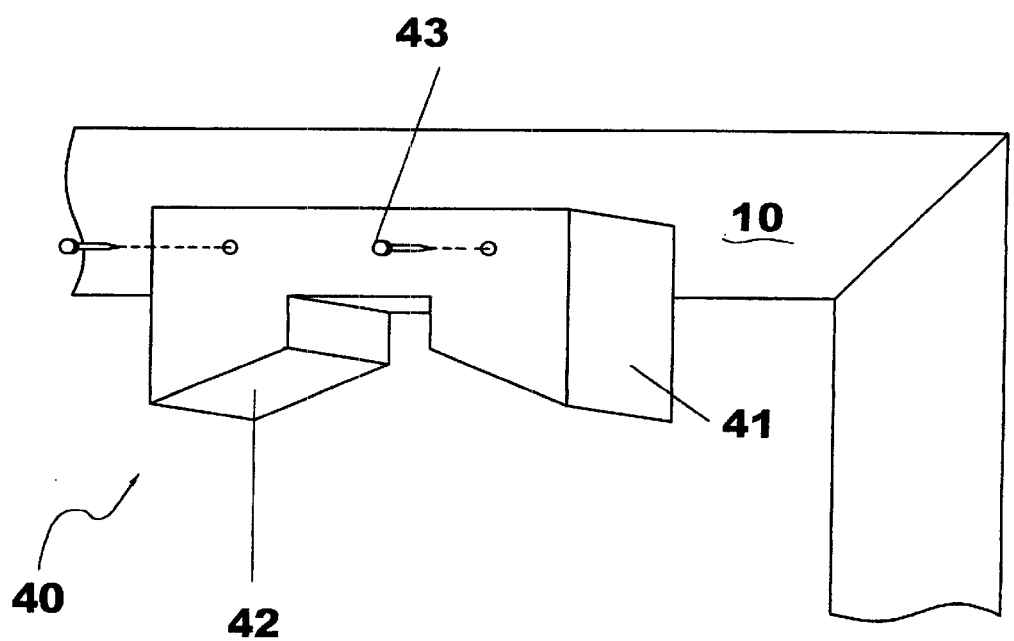
FIG. 8 illustrates a third embodiment of the picture attachment assembly.
Figure 9:
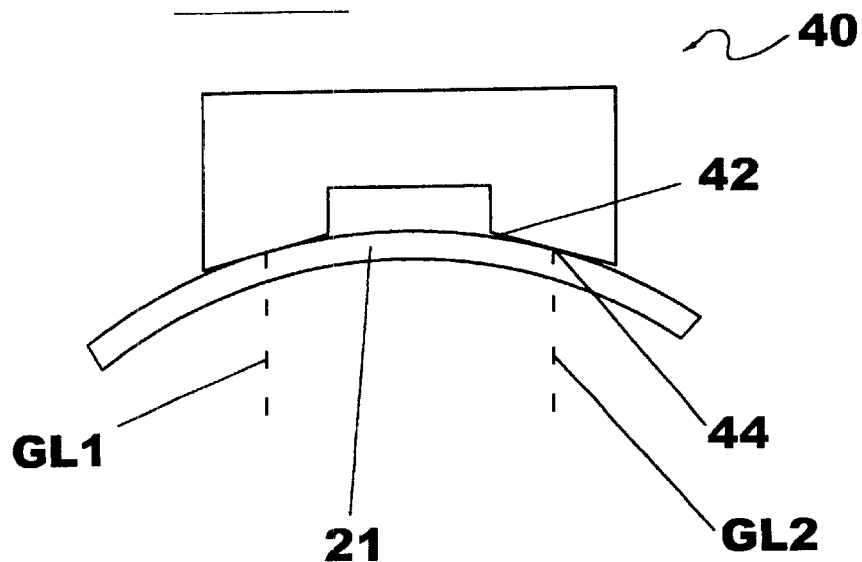
FIG. 9 shows the third embodiment of the picture attachment assembly disposed on a wall attachment assembly of the above kind.

A third embodiment of the invention is illustrated in FIGS. 8–9. The main difference of this embodiment is that instead of resting an actual curved support area 30 on support area 21, a virtual curved support area defined by two lines contact support area 21. As shown in FIGS. 8–9, picture attachment assembly 40 is preferably a block with two extensions 41, each of which end on contact areas 42. Preferably, contact areas 42 are substantially planar and inclined.

When picture attachment assembly 40 is disposed on support area 21, each contact area 42 contact support area 21 at one point and/or line 44. (Gravity planes GL1, GL2 originate from line 44.) Such arrangement removes any play that may be present if support areas are not substantially concentric. Persons skilled in the art will recognize that a similar result may be achieved by substantially reducing the curvature of support area 30, so that the contact lines 44 are formed when ends 36, 37 contact support area 21.

Picture attachment assembly 40 is preferably attached to picture 10 via nails 43. Persons skilled in the art will note that at least two nails are preferably used to mount picture attachment assembly 40, but these persons should also note that one nail may be used for mounting.

Figure 10:
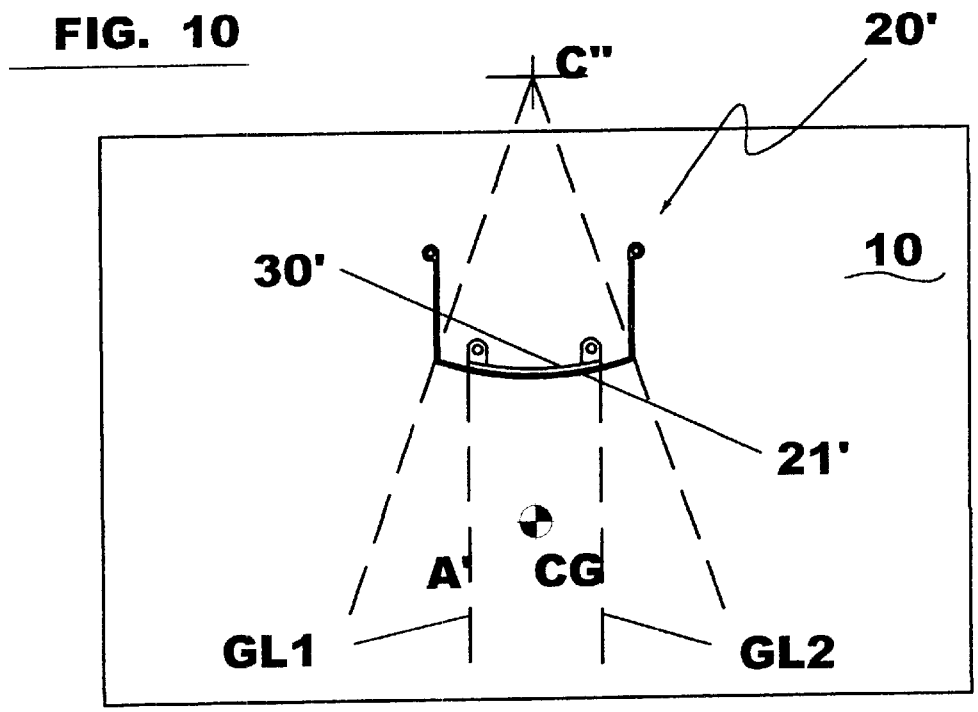
FIG. 10 shows a fourth embodiment of the picture hanger assembly of the present invention, and its relationship to the center of gravity of the picture.

Persons skilled in the art will recognize that the above embodiments all disclose or suggest curvatures having centers below the different assemblies. However, persons skilled in the art should recognize that the centers of these curvatures may be disposed above of the different assemblies, as shown in FIG. 10. For example, curved support areas 21' and 30' are substantially concentric and thus have a center C". Area A' may be defined by lines extending from center C" and intersecting the ends of either curved support area, or in a manner similar to that explained above. Accordingly, center of gravity CG preferably lies within area A', so that picture hanger assembly 20' can diminish the effect of the moment created by gravity and maintain picture 10 in alignment. Again, it is also preferable that the center of gravity CG lies between gravity planes GL1, GL2.

Persons skilled in the art may recognize other alternatives to the means disclosed herein. However, all these additions and/or alterations are considered to be equivalents of the present invention.

I claim:

1. A picture hanger for hanging a picture having a center of gravity comprising:

a wall attachment assembly for attachment to a wall, the wall attachment assembly comprising a first curved support area extending away from the wall, the first curved support area having a first center at a first radial distance and left and right ends;

a picture attachment assembly for attachment to the picture, the picture attachment assembly comprising a second support area connected to the picture, the second support area having left and right ends;

wherein the first and second support areas contact each other at two contact lines, each contact line being intersected by a corresponding substantially vertical plane, and the radial distance being larger than distance between the two contact lines, so that, when the hanger is used to support the picture, the center of gravity is between both vertical planes, and the first and second support areas being freely movable relative to each other that, if the center of gravity is not between both vertical planes, the picture can rotate so that the center of gravity is between both vertical planes.

2. The picture hanger of claim 1, wherein the second support area is curved and has a second center at a second radial distance.

3. The picture hanger of claim 2, wherein the center of gravity lies within an area defined by a first line extending from one of the first and second centers and intersecting the left end of one of the first and second support areas, and a second line extending from the one of the first and second centers and intersecting the right end of one of the first and second support areas.

4. The hanger of claim 2, wherein the first and second support areas are substantially concentric.

5. The hanger of claim 2, wherein the second center is above the second curved support area.

6. The hanger of claim 2, wherein the second center is below the second curved support area.

7. The hanger of claim 2, wherein curvature radius of the second curved support area is substantially equal to or smaller than curvature radius of the first curved support area.

8. The hanger of claim 2, wherein the first center is below the first curved support area.

9. The hanger of claim 2, wherein the first center is above the first curved support area.

10. The hanger of claim 1, wherein at least one of the wall attachment assembly and the picture attachment assembly has a retaining lip.

11. The hanger of claim 1, wherein the wall attachment assembly further comprises a body supporting the first curved support area.

12. The hanger of claim 1, wherein the wall attachment assembly further comprises means for allowing nails to extend through the assembly.

13. The hanger of claim 1, wherein the second support area extends away from the picture.

14. The hanger of claim 1, wherein at least one of the first and second support areas is inclined relative to the wall.

15. The hanger of claim 14, wherein the at least one of the first and second support is inclined at an angle between about 60° and 70° relative to the wall.

16. A picture hanger for hanging a picture having a center of gravity comprising:
- a wall attachment assembly for attachment to a wall, the wall attachment assembly comprising a body disposed flush on a wall, and first curved support area extending away from the body, the first curved support area having a first center at a first radial distance and left and right ends;
- a picture attachment assembly for attachment to the picture, the picture attachment assembly comprising a second support area connected to the picture, the second support area having left and right ends;

wherein the first and second support areas contact each other at two contact lines, each contact line being intersected by a corresponding substantially vertical plane, and the radial distance being larger than distance between the two contact lines, so that, when the hanger is used to support the picture, the center of gravity is between both vertical planes.

17. The picture hanger of claim 16, wherein the second support area is curved and has a second center at a second radial distance.

18. The picture hanger of claim 17, wherein the center of gravity lies within an area defined by a first line extending from one of the first and second centers and intersecting the left end of one of the first and second support areas, and a second line extending from the one of the first and second centers and intersecting the right end of one of the first and second support areas.

19. The hanger of claim 17, wherein the first and second support areas are substantially concentric.

20. The hanger of claim 17, wherein the second center is above or below the second curved support area.

21. The hanger of claim 17, wherein curvature radius of the second curved support area is substantially equal to or smaller than curvature radius of the first curved support area.

* * * * *